United States Patent [19]

Burg

[11] 4,165,703

[45] Aug. 28, 1979

[54] AIR RIDE BOAT HULL

[76] Inventor: Donald E. Burg, 15840 SW. 84th Ave., Miami, Fla. 33157

[21] Appl. No.: 818,303

[22] Filed: Jul. 25, 1977

Related U.S. Application Data

[63] Continuation-in-part of Ser. No. 737,403, Nov. 1, 1976, abandoned.

[51] Int. Cl.² .............................................. B63B 1/34
[52] U.S. Cl. ................................... 114/67 A; 114/289
[58] Field of Search .................. 114/67 A, 67 R, 271, 114/288–291; 115/39

[56] References Cited

U.S. PATENT DOCUMENTS

| 1,835,564 | 12/1931 | Grayson et al. | 114/290 |
| 2,231,296 | 2/1941 | Sartori | 114/291 |
| 2,234,899 | 3/1941 | Higgins | 114/67 A |
| 2,900,945 | 8/1959 | Canazzi | 114/288 |
| 3,051,115 | 8/1962 | Canazzi | 114/288 |
| 3,140,687 | 7/1964 | Beardsley | 114/67 A |
| 3,331,347 | 7/1967 | Von Heidenstam | 114/67 A |
| 3,477,400 | 11/1969 | Walker | 114/289 |
| 3,547,064 | 12/1970 | Glass | 114/289 |
| 3,937,173 | 2/1976 | Stuart | 115/39 |

*Primary Examiner*—Jesus D. Sotelo
*Attorney, Agent, or Firm*—Robert J. Van Der Wall

[57] ABSTRACT

A V boat hull with air chamber substantially aft and entirely beneath the waterline. The air chamber reduces drag, thereby improving hull efficiency and speed, without substantially altering V hull handling characteristics and aesthetics.

21 Claims, 17 Drawing Figures

NOTE: $D_{INDUCED} = D_{LIFT} + D_{SPRAY}$

AIR RIDE BOAT HULL

CROSS REFERENCE TO OTHER APPLICATION

This application is a continuation-in-part to applicant's co-pending application, Ser. No. 737,403, filed Nov. 1, 1976, now abandoned, and reflects descriptions contained in disclosure documents No. 050506, filed June 30, 1976, and No. 057673, filed Feb. 7, 1977.

BACKGROUND OF THE INVENTION

The present invention relates to the field of boat hull design, and, more particularly, to efficiency and speeds improvement upon V hulls without substantially altering well known and widely accepted V hull handling characteristics and aesthetics.

It should be noted that, as used herein, V hull refers not only to the conventional V hull, but also to all modifications of it that employ the same general hull configuration, particularly below the waterline. Therefore the so-called "cathedral" hull is included, since in dynamic, steady state, straight line operation it acts as a V hull and the data hereinafter recited applies generally to it.

The V hull the is most commonly used hull design, which may be modified for particular applications, as disclosed by Wollard, U.S. Pat. No. 3,469,557, Stuart, U.S. Pat. No. 3,515,087, and Cole, U.S. Pat. Nos. 3,602,179, D219,627 and D224,275. Such hull designs are popular in part because the design is relatively simple, the bow is effective in cutting through waves, as recited by Bremer, U.S. Pat. No. 3,930,455, and because the V hull offers a smooth ride, seaworthiness and good handling and steering characteristics as recited by Stuart and Wollard.

If the V is flattened out towards the stern, it may be to permit greater efficiency, since there is a lesser amount of wetted surface which reduces drag. Of course, the flatter the overall hull, the less the drag and the greater the speed, but the rougher the ride. Actually most hull design is a compromise between efficiency and comfort, and boats intended for rough water use often have a deep V in the hull notwithstanding the greater drag that results.

Drag on any boat hull is made up of several components. Induced drag is made up of drag due to lift and spray drag, and is a major component with a conventional V hull. Frictional or wetted area drag is a second major component. Appendage drag results from rudders, propellers, struts, etc. Aerodynamic drag is generally a very small component.

Efforts to improve efficiency of boat hulls naturally focuses on ways to reduce drag in any form.

One well known way to improve efficiency has been use of the hydrofoil craft. Hydrofoils achieve greatly increased speed for equivalent power consumption and, to some degree, avoid roughness resulting from waves, but suffer from fouling, strains resulting from the cantilevered posture of the foils, deep draft at rest, high maintenance, docking difficulties, and are highly inefficient at less than foil speed.

A major effect to reduce drag was the introduction in England several decades ago of a water craft intended to hover over the surface on a cushion of air. The air leaked beneath a skirt that surrounded the base of the craft. One significant shortcoming of this device was that power consumption to replace the air that leaked from the entire 360 degree skirt was too great to make the device practical and efficient, at least for many applications. Sideslipping and stability were also problems. However, hydrodynamic drag components could be largely eliminated.

Compromise solutions were also sought, often by introducing air between the hull and the water in some manner. So called air cushion vehicles were then developed, including a subcategory of the latter sometimes referred to as the captured air bubble craft, with which art the present invention deals.

Ford, U.S. Pat. No. 3,146,752, Beardsley, U.S. Pat. No. 3,140,687, Mantle et al, U.S. Pat. No. 3,476,069, and Crowley, U.S. Pat. No. 3,742,888 are all examples of this genus of boat hull invention. All suggest partial submergence of the sidewalls or skirts of the craft, but rely principally or entirely upon an air cushion for support of the craft when underway, and utilize the sidewall or skirt submergence largely as a seal to minimize escape of the supporting air cushion. Such devices are still primarily vehicles supported by air and represent significant departures from conventional and widely used V hull designs.

The extreme may well be Gunther, U.S. Pat. No. 3,473,503, which appears to be highly complex and expensive, consuming virtually all usable hull space, and with gross aesthetic effects, notwithstanding asserted amphibious capability.

Moreover, all of the foregoing air cushion inventions, including Ford, Beardsley, Mantle et al, Crowley and Gunther, do not appear to be stable in other than smooth water in small sizes, draw a great deal of water when at rest, and are not practical in small sizes appropriate to pleasure craft. In fact, the U.S. Navy is known to prefer the largest sizes of this type of craft, called by them the "Surface Effect Ship", or SES, and is known to have established a research program for development of large SES's, as disclosed in the May 31, 1973 issue of *Machine Design*, pp. 20–25. Also, many of the air cushion designs include expensive, high maintenance seals at the waterline, and some, such as Ford, use complex, movable seals.

There have also been efforts to adapt airfoils to other types of hulls, such as Walker, U.S. Pat. No. 3,477,400, with a hydrofoil, and Szptyman, U.S. Pat. No. 3,702,598, with a customized tunnel hull. In Walker, any significant aerodynamic effect from the airfoil surface would have to arise at substantial forward speed relative to the ambient air since there is no other technique disclosed for air movement or pressurization. By comparison, Szptyman optionally offers a blower to force feed air to the aerodynamic lifting surface, but the tunnel is still open to the atmosphere, thus requiring substantial forward speed relative to the ambient air much as with Walker. Neither reference is a "captured air bubble" design.

Of course, both Walker and Szptyman also represent significant departures from conventional and widely used V hull designs, and Szptyman consumes much usable hull space.

Glass, U.S. Pat. No. 3,547,064 is a modified form of this class of invention, except that it receives no support from whatever air cushion produced. While the hull exterior in Glass provides a semblance of an air chamber, that air chamber is open to the atmosphere in a manner similar to Szptyman, thereby providing no lift, reduction of drag resulting from less induced drag, etc.

The closest known art is Von Heidenstam, U.S. Pat. No. 3,331,347, which includes the concept of a blower connecting through duct work to a recess in the aft portion of a hull. Von Heidenstam, however, provides for an air chamber aimed at reducing friction drag through the interpositioning of an air layer between a substantial portion of the wetted hull area and the water's surface. Von Heidenstam is incapable of preventing lateral leakage of the air from the sides of the air chamber because it lacks structure to do so, and is not truly a "captured air bubble" concept because there is no capturing of the air. Von Heidenstam lacks the ability to significantly reduce induced drag that results from lift because there is no sharp or substantially right angle intersection of the air chamber with the exterior of the hull surface, there are no extended side walls, the side walls are not parallel to the keel, and the side walls are specifically recited in Von Heidenstam to terminate at or near the "bilge lines" or chines which is extremely close or at the water line of the boat.

SUMMARY OF THE INVENTION

With the foregoing in mind, it is a principal object of the present invention to combine the simplicity, good handling, turning, hull space, riding comfort, seaworthiness and planing characteristics of the conventional V hull with the efficiency, speed, and shallow draft characteristics of water craft supported at least in part by a cushion of air.

It is a related object of the invention to adapt the well known and popularly accepted V hull to more efficient and faster use without dilution of its aesthetic qualities.

It is a further object of the invention to adapt the efficiency, speed, and shallow draft characteristics of water craft supported at least in part by a cushion of air to practical craft.

Another object of the invention is to utilize the aforementioned air cushion advantages without significant consumption of hull space.

A further object of the invention is to utilize the aforementioned air cushion advantages without significant cost in major hull and boat interior design changes and retooling costs.

One more object of the invention is to utilize the aforementioned air cushion advantages by making changes in hull shape that are entirely below the waterline and that do not significantly affect draft of the boat when quiescent.

A further object of the invention is to utilize the aforementioned air cushion advantages without creating surfaces or parts prone to fouling, high maintenance, or damage, and which will not cripple or seriously hamper use of the boat if the air cushion feature is rendered inoperative.

One more object of the invention is to increase flexibility in the use of the air cushion, such as by permitting its use at a wider range of speeds.

Another object of the invention is to provide a trim control device on substantially conventional V hulls.

Other objects and advantages of the present invention will become apparent from the following descriptions and claims, and the accompanying drawings.

In accordance with the present invention, there is disclosed a boat V hull with a conventionally shaped bow and keel extending aft, but with the V hull interrupted substantially aft by at least one recess. The recess will generally be symmetrical about the plane of the keel and intersects the exterior of the hull entirely below the waterline.

The recess becomes an air chamber when substantially purged of water by pressurization. It is connected to pressurizing means. Such means includes a powered blower in fluid communication with recess, such as through an air supply duct which may also include a pressure control valve, and an air chamber inlet. Of course there is also an air inlet to the blower intake.

When water is purged from the recess by pressurization, the recess becomes an air chamber and acts as an air cushion, reducing the wetted surface area and creating lift. This has the effect of reducing induced drag, made up of both lift and spray drag. It also reduces frictional drag, since the wetted area is correspondingly reduced.

However, the recess being relatively small, does not consume so much of the displacement volume of the hull when the invention is quiescent to significantly alter hull draft when at rest. Similarly, the pressurizing means and recess together do not significantly consume the space inside the hull, and the pressurizing means may be positioned virtually anywhere inside the hull for design convenience.

DETAILED DESCRIPTION

Referring now to each of the above figures in turn, and using like numerals to designate similar parts throughout the several views, a preferred embodiment and several alternative embodiments will now be described.

Figure 1:
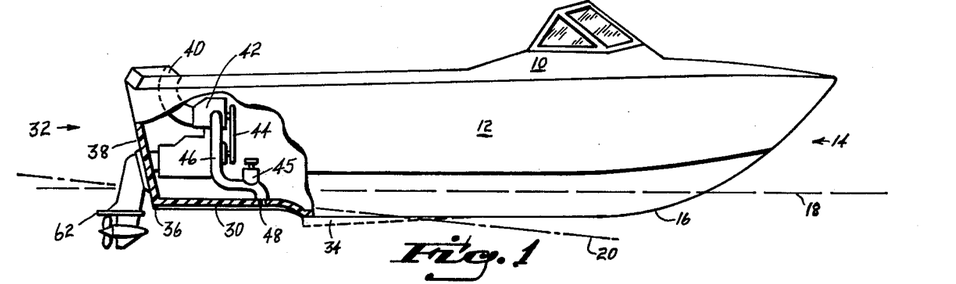
FIG. 1 is a partially cut away side elevation of a small V hull boat built with the invention and showing in the cut away portion the centerline cross section of the air chamber, air supply duct with pressure control valve, blower and power supply, and air inlet.

FIG. 1 discloses a motor boat 10 made with the inventive hull 12. A conventional bow 14 and keel 16 are included. Substantially aft, well beneath the static waterline 18, and also below the dynamic waterline 20, the hull 12 is interrupted by a recess 30. The recess 30 extends aft toward the stern 32, and may intersect at 36 with the transom 38.

The recess 30 becomes an air chamber when pressurized to substantially purge the water. Means to pressurized the recess 30 includes an air inlet 40, a blower 42 and its variable speed power supply 44, an air supply duct 46, with pressure control means 45, and chamber inlet 48, all sized to purge a suddenly flooded recess within a maximum of a few seconds. The keel 16 may be modified slightly as at 34, if necessary.

The pressure control means 45 may be used not only to control proper operation of the air chamber, but also may serve as a trim control device, since the magnitude of pressurization of the air chamber will affect the lift created therefrom, and that lift is centered aft of the hull center of gravity.

Figures 2, 3, 4, 5, 6:
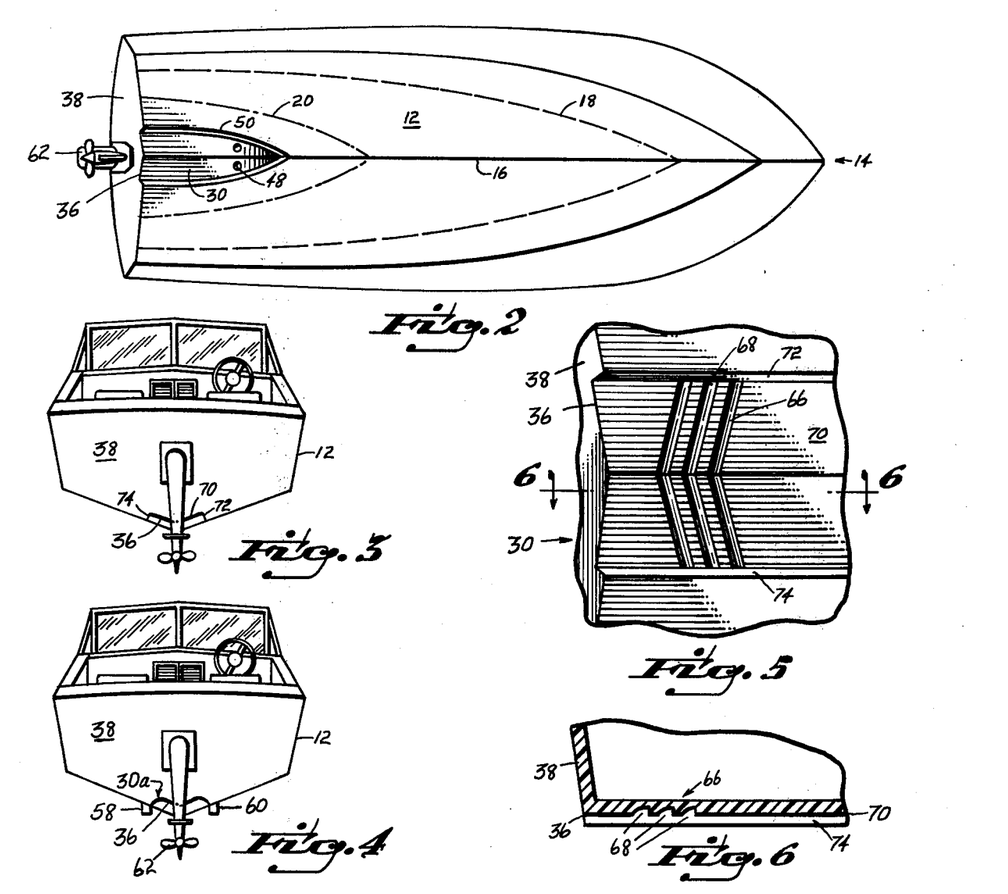
FIG. 2 is a bottom view of a small V hull boat built with the preferred embodiment of the invention.
FIG. 3 is a stern elevation of a small V hull boat built with the preferred embodiment of the invention.
FIG. 4 is a stern elevation of an alternative embodiment to that shown in FIG. 3.
FIG. 5 is an enlarged fragmentary bottom view of part of the recess and its intersection with the transom, and shows another alternative embodiment.
FIG. 6 is a fragmentary enlarged cross section view along the line 6—6 in FIG. 5.

In FIG. 2, the conventionally shaped bow 14 and keel 16 are shown well forward of the recess 30. The intersection 50 of the recess 30 with the exterior of the hull 12 is well beneath the static waterline 18, and also below the dynamic waterline 20. The recess 30 is symmetrical about the plane of the keel 16.

FIG. 3 shows the intersection 36 of the recess with the transom 38 of the hull 12. Also shown are the side walls 72 and 74 and the floor 70 of the recess, as well as the boat's external propulsive components 62. To be noted is the substantially right angle intersection of the sidewalls 72 and 74 with the exterior of the hull 12.

FIG. 4 shows a first alternative embodiment of the invention that includes a contoured recess 30a, whose floor and sidewalls are blended into a curvilinear shape, thus minimizing recess volume and drag when the recess is flooded. Also shown are extended parallel sidewalls 58 and 60, which increase the depth of the recess 30, and act as an extended dual keel in the aft portion of the hull 12. These extended parallel sidewalls, 58 and 60, have been shown in testing to be the preferred embodiment of the invention; providing substantially improved retention or capture of the air in the recess 30 when the invention is operated in water having waves, as is usual.

FIG. 5 shows a second alternative embodiment with a labyrinth seal 66 near the intersection 36 of the recess 30 with the transom 38. The labyrinth seal 66 may comprise at least one groove 68 or other discontinuity in the floor 70 of the recess 30, stretching from sidewall 72 to sidewall 74, and aft of the chamber inlet 48 (not shown in FIG. 5). The seal, of course, is to minimize the loss of air in the air chamber as the hull moves through the water.

FIG. 6 shows the labyrinth seal 66 in cross section along the line 6—6 of FIG. 5. The one or more grooves 68 are disposed in proximity to each other and near the intersection 36 of the floor 70 with the transom 38. They may be of a depth that is of the same order of magnitude at the sidewall 74, and may either form a chevron with the plane of the keel or run straight across the recess.

Figure 7:
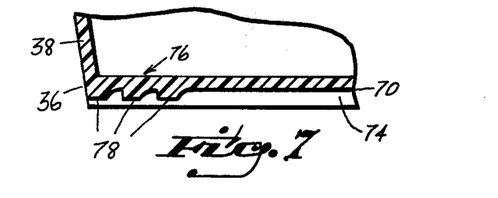
FIG. 7 is a fragmentary enlarged cross section view along the line 6—6 in FIG. 5, but of another alternative embodiment.

FIG. 7 shows an alternative embodiment to the labyrinth seal. Located at or near the intersection 36 of the floor 70 with the transom 38, the step seal 76 may comprise one or more ridges 78 or other discontinuities above the floor 70. They may be of the same order of magnitude as the sidewall 74, and the purpose, again, is to minimize the loss of air in the air chamber.

Figure 8:
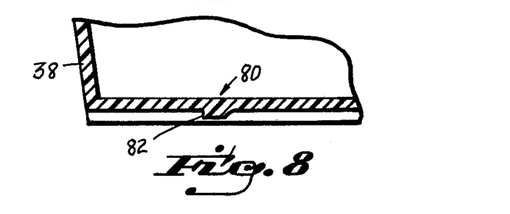
FIG. 8 is a fragmentary enlarged cross section view along the line 6—6 in FIG. 5, but of yet another alternative embodiment.

FIG. 8 shows yet another alternative embodiment of the invention. This Figure illustrates that the air chamber need not extend to the transom 38, since the air chamber substantially ends at the seal 80. This may be effected to establish the lift from the air chamber at the proper point to preliminarily optimize trim of the hull 12, although hull trim as an operating variable is extremely well controlled by the magnitude of pressurization of the air chamber. The seal 80 is shown as a single step 82, but could equally be other discontinuities, such as the labyrinth seal of FIGS. 5 and 6, the step seal of FIG. 7, etc.

Figure 9:
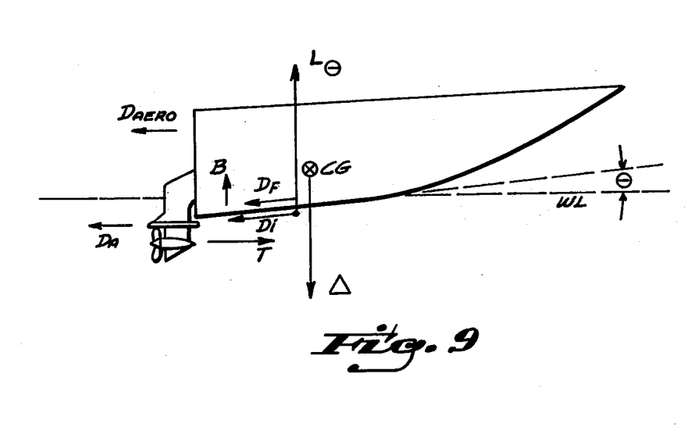
FIG. 9 is a schematic free body diagram of a conventional V hull boat underway in a steady state condition, showing the forces acting upon the hull.

FIG. 9 schematically illustrates the forces acting upon a conventional V hull boat underway in a steady state condition. B stands for bouyancy, and is generally negligible in a planing craft. $\Theta$ refers to the angle of attack from the waterline WL. CG means center of gravity of the boat, while $\Delta$ is displacement weight. $L_\Theta$ refers to lift due to the angle of attack, T is thrust and the various drag components are drag from wetted area friction, $D_F$, drag from appendages $D_A$, induced drag $D_i$ due to drag from lift and spray drag, and aerodynamic drag $D_{aero}$.

Figure 10:
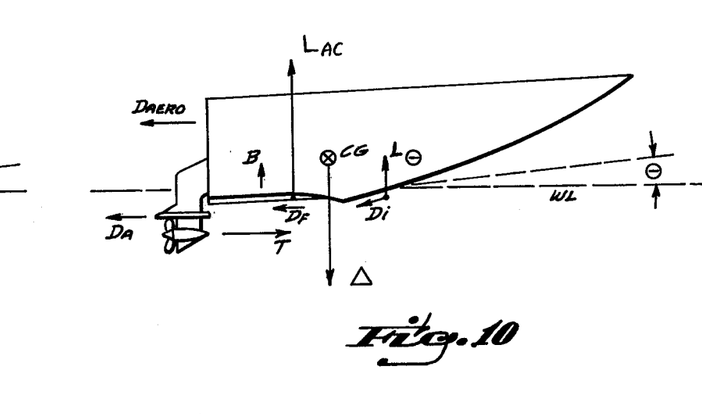
FIG. 10 is a schematic free body diagram of a V hull boat made with the invention, also underway in a steady state condition, showing the forces acting upon the hull.

The same symbols apply to the forces shown in FIG. 10, to which is added lift from the air chamber $L_{AC}$.

Figure 11:
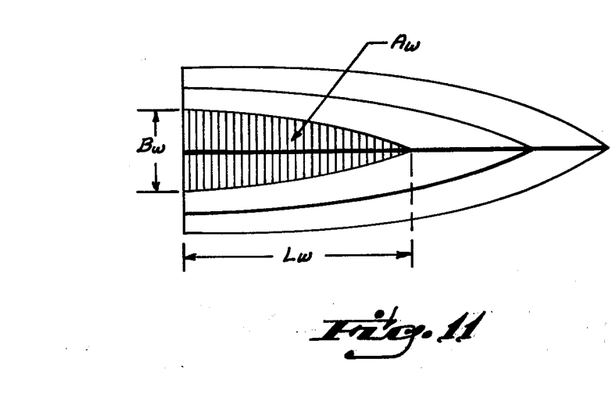
FIG. 11 is a schematic bottom view of the conventional hull shown in FIG. 9 showing the wetted area of the hull.

In FIG. 11 the wetted area $A_W$ is shown cross hatched with its principal dimensions consisting of wetted length $L_W$ and wetted beam $B_W$.

Figure 12:
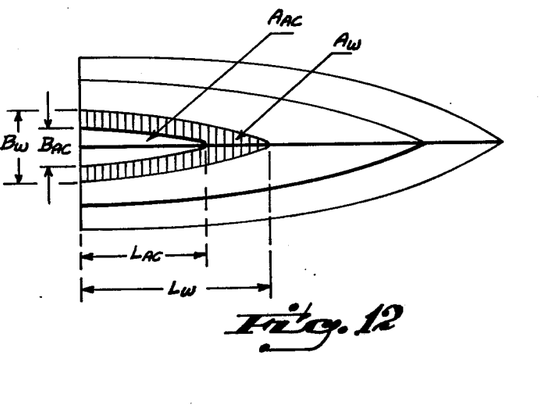
FIG. 12 is a schematic bottom view of the inventive hull shown in FIG. 10 showing the reduced wetted area of the hull.

FIG. 12 shows the same symbols as in FIG. 11, and subtracts the area of the air chamber $A_{AC}$, length of the air chamber $L_{AC}$ and beam of the air chamber $B_{AC}$.

Figure 13:
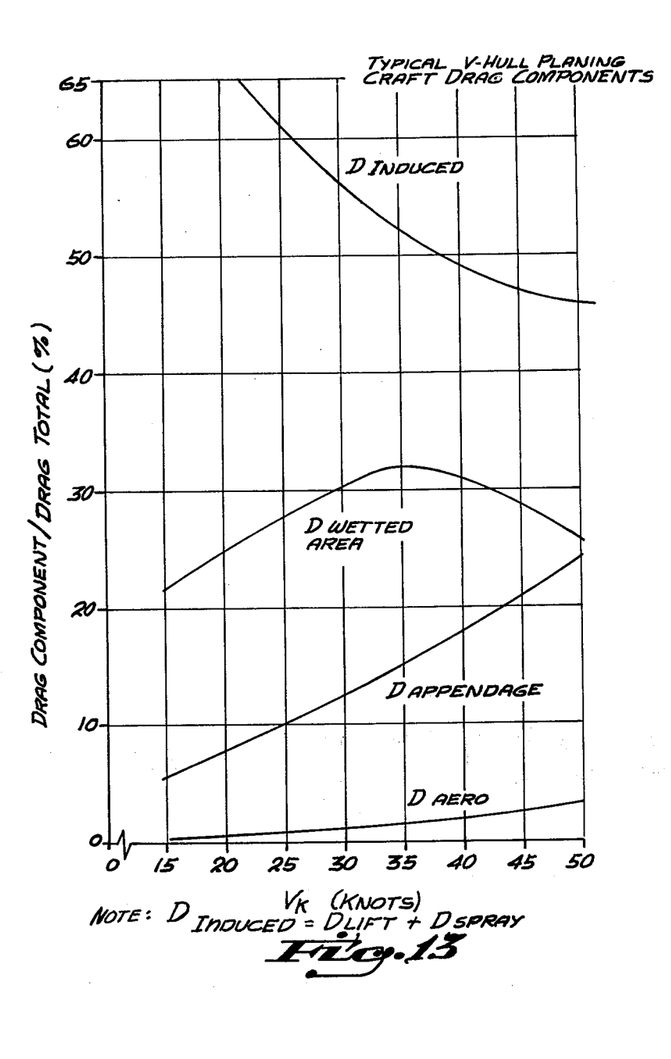
FIG. 13 is a graph showing typical V hull drag components that have been previously established and are not a part of the invention.

FIG. 13 is a graph showing typical V hull planing craft drag components plotted as a ratio of total drag over a velocity range of 15 to 50 knots. These data are typical of those well known in the art. It should be noted that the graph refers to $D_F$ (or drag from wetted area friction) as $D_{Wetted\ Area}$, which is the same thing.

Figure 14:
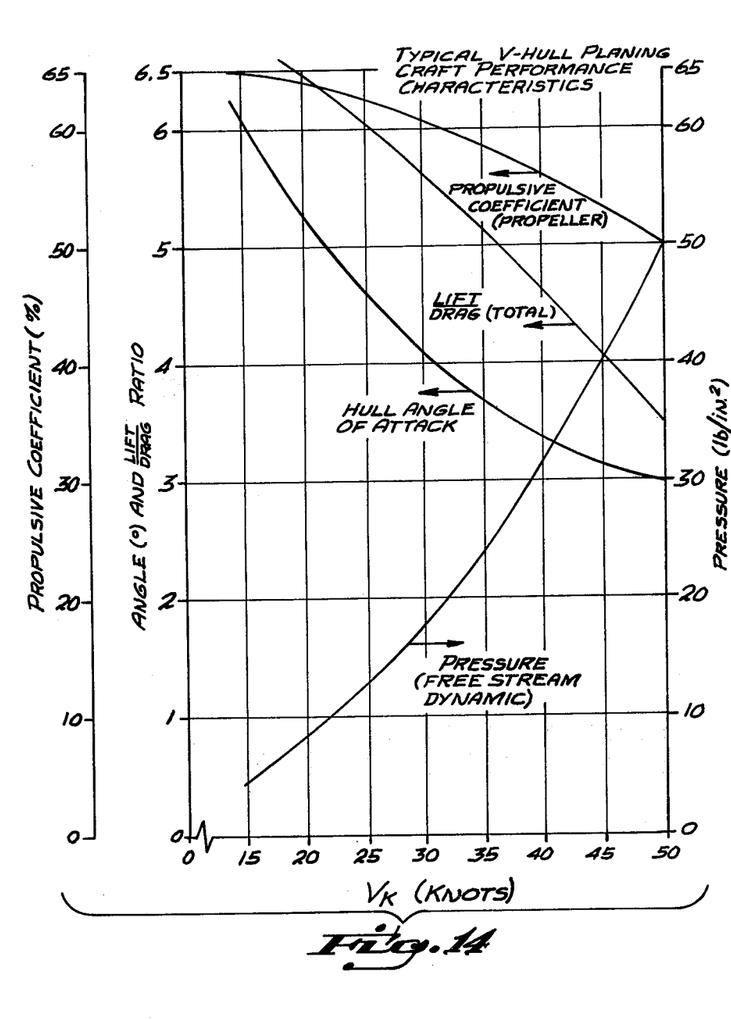
FIG. 14 is a graph showing typical V hull performance characteristics that have been previosly established and are not part of the invention.

FIG. 14 is a graph showing typical V hull craft performance characteristics of a type well known in the art. All are plotted as a function of velocity in knots. Free stream dynamic pressure is plotted on the ordinate to the right. Hull angle of attack is plotted on the inner left ordinate. Lift over total drag ratio is plotted on the same ordinate. Propulsive coefficient is plotted on the outer left ordinate.

Figures 15, 16, 17:
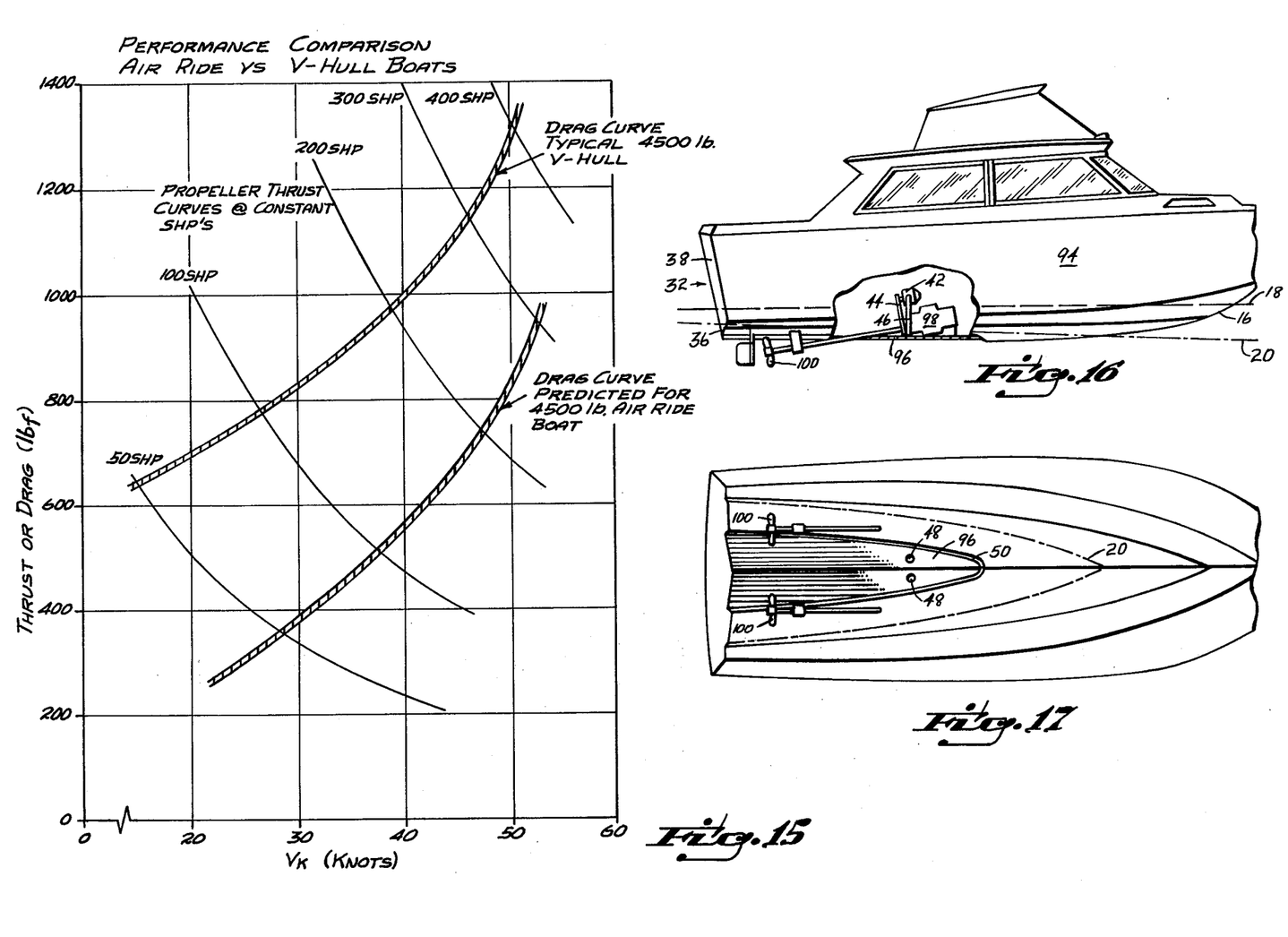
FIG. 15 is a graph comparing performance of the invention with a conventional V hull boat, using data from FIGS. 13 and 14.
FIG. 16 is a partially broken and partially cut away side elevation of a V hull boat larger than that shown in FIG. 1, built with the invention and showing in the cut away portion the centerline cross section of the air chamber, air supply duct, blower and power supply.
FIG. 17 is a bottom view of a FIG. 16 larger V hull boat built with the invention.

FIG. 15 shows a comparison of the predicted performance characteristics between a 4500 pound typical conventional V hull boat and a 4500 pound boat made with inventive hull. The values for the conventional craft are obtained from FIGS. 13 and 14 and the well established relationship that Total drag equals the weight divided by the lift over drag ratio, or $D=Wt/L/D$, when in a steady state dynamic situation. Looking to FIG. 14, at 30 knots, lift over drag ratio equals approximately 5.5. With a boat of 4500 pounds, total drag equals approximately 820 pounds.

Then looking to FIG. 13 at 30 knots, $D_{aero}$ equals approximately 1.5% or 12 pounds, $D_{appendage}$ equals approximately 12% or 98 pounds, $D_{wetted\ area}$ equals approximately 30.5% or 250 pounds, and $D_{induced}$ equals approximately 56% or 460 pounds. The figures for $D_{wetted\ area}$ and $D_{induced}$ are of particular interest for comparison purposes, but should be put aside for the moment.

To calculate drag of a boat made with the inventive hull, assume an air chamber with a projected horizontal area of ten square feet and an air pressure of 1.8 psig inside the air chamber. Lift from the air chamber would then be 1.8 times 144 square inches per square foot times 10 square feet or approximately 2600 pounds. Since the boat weighs 4500 pounds, this leaves approximately 1900 pounds to be supported in the conventional manner.

The area required to support the 1900 pounds is reduced in direct proportion to the weight ratio. Moreover, both $D_{wetted\ area}$ and $D_{induced}$ are reduced in the same ratio. Therefore, for a 4500 pound boat made with the inventive hull, drag from these two components equals 1900 pounds over 4500 pounds times the sum of the figures previously set aside, 250 pounds and 460 pounds, or about 300 pounds.

If it is assumed that $D_{aero}$ and $D_{appendage}$ are the same for both boats at 12 plus 96 pounds or 108 pounds, the total drag for a boat made with the inventive hull is approximately 100 plus 300 pounds or about 400 pounds, compared to total drag for the conventional hull of about 820 pounds. These are the approximate data points on FIG. 15 at 30 knots, and the same procedure is followed to obtain the other points for the drag curves.

The propeller thrust curves are superimposed on the drag curves in FIG. 15 using the well established relationship for Propulsive Coefficient equal to thrust in pounds times velocity in feet per second divided by shaft horsepower times the constant of 550 feet-pounds per shaft horsepower-seconds. The relationship is then solved for thrust and the curves generated using the propulsive coefficient values from FIG. 14.

FIG. 15 reveals that, comparing a 4500 pound conventional V hull boat having 100 shaft horsepower with a 4500 pound boat having the inventive hull and the same shaft horsepower, a speed increase from approximately 27 knots to approximately 38 knots could be expected. Of course, if the blower were driven from the conventional power source, this would reduce the shaft horsepower slightly, but interpolating on FIG. 15, a substantial speed increase of almost 10 knots would be realized, since the blower plus related losses would consume only several horsepower. Looking at it another way, the 100 shaft horsepower curve intersects the 4500 conventional craft drag curve at approximately 27 knots. For the same speed of 27 knots, it can be seen that the power consumption drops to less than half that when dropping down to the inventive hull 4500 pound boat drag curve, thereby effecting enormous fuel savings and operating costs.

Turning now to FIG. 16, there is disclosed in side elevation an alternative embodiment in the form of a hull larger than that shown in FIG. 1, such as might be used in the larger cabin cruisers, or for commercial or military purposes. The bow is broken away and not shown but is of conventional design, as is a keel 16. Aft, well beneath the static waterline 18 and slightly below the dynamic waterline 20, the hull 94 is interrupted by a recess 96. The recess 96 is relatively larger than the comparable recess 30 in the hull of FIG. 1 because the larger craft of FIG. 16 may tend to be more of a displacement craft and less of planing craft than that shown in FIG. 1. Thus the dynamic waterline 20 is higher on FIG. 16 than it is on FIG. 1, and this, in turn, permits the recess to be larger, while staying beneath the dynamic waterline. The recess 96 extends aft toward the stern 32 and may intersect at 36 with the transom 38.

The recess 96 becomes an air chamber when pressurized to substantially purge the water. The means to pressurize the recess 96 may include the same or equivalent elements as described for the preferred embodiment, and are not shown except for the blower 42, power supply 44, and an air supply duct 46. The boat shown is powered by inboard engines 98, and twin screw propellers 100.

In FIG. 17, the bottom view of the alternative embodiment of FIG. 16 is shown, particularly showing the higher dynamic waterline 20 and consequent larger area to permit a larger recess 96, while still maintaining the intersection 50 of the recess with the exterior of the hull below the dynamic waterline 20. The twin screw propellers 100 are also shown, and the recess 96 is substantially purged of water through the chamber inlets 48.

It will be evident from the foregoing that substantial advantages accrue from the invention without the primary disadvantages of prior art air cushion water craft. Much of this results from being able to combine in the invention utilization of a largely unmodified basic V hull design, in all its variations and with all its time tested and approved advantages. Those advantages, mostly traded away by the prior art hereinabove described include simplicity and low cost, a bow effective in cutting through waves, smooth ride, seaworthiness, and good handling and steering characteristics.

It will also be clear from the foregoing that the present invention offers a number of advantages not found in the prior air cushion art including the following: The invention does not consume any significant amount of internal hull space, because the recess is relatively small and the equipment to pressurize it is simple and, other than the recess, requires no specific location. In this connection, the invention is simple and inexpensive, requiring only minor hull modifications and the use of pressurizing means that is largely made up of commercially obtainable parts that demand little custom fabrication and hand work. Also, the retooling cost would be minimal because molds used to make fiberglass hulls could usually be readily modified by the insertion of a block in the shape of the recess into the pre-existing mold.

A major advantage of the invention over the prior art is the ability to reduce induced drag as well as friction drag through the use of the captured air bubble concept, while still retaining the V hull design. This is made possible only by isolation of the air chamber from the dynamic water line of the boat in the lateral perimeter of the recess.

Another advantage not found in prior air cushion art is that the present invention retains the widely accepted aesthetics of conventional V hulls since the appearance is the same above the waterline.

Because the basic V hull is retained, the present invention retains the great stability in the water that the conventional hull has, including the variations of it such as the cathedral hull. In contrast, hulls supported entirely or principally by an air cushion, particularly those in small sizes, are known to be unstable in other than smooth water, with instability a function of hull size.

A further advantage of the present invention is that it does not draw significantly more water when quiescent, again in contrast to hovering or prior art air cushion craft, which, at rest in the water, sink down and draw a great deal of water. Furthermore, without their air cushion system working, all captured air bubble prior art is either hopelessly crippled, has too little freeboard, and/or has enormous drag. By comparison, the present invention is highly functional without its air cushion operative, since the flooded recess would add only nominal drag to that experienced by a conventional V hull boat because of the relatively small size and streamlined shape of the recess.

Of course, all of the advantages of the present invention are achieved without creating surfaces or parts that are particularly prone to fouling, high maintenance, damage or docking difficulties, all of which may be true for hydrofoils. Moreover, the present invention is not subject to particular low speed inefficiencies or lack of any advantages at low speeds, as is true of certain prior art. The invention thus increases flexibility in the use of an air cushion, such as by permitting its use at a wider range of speeds. And a related advantage is that the invention has no expensive, movable seals which require high maintenance.

Several more advantages include the adoption of the air cushion concept to a practical planing craft and the ability to use the air cushion as a trim control device, since the lift created by it is centered aft of the hull center of gravity.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

I claim:

1. In an improved V hull of the type having at least one bow, keel, stern, exterior surface and waterline wherein the improvement comprises:
    at least one recess in the hull substantially aft, said recess intersecting the exterior surface of the hull at substantially right angles thereto entirely below the waterline, having sidewalls substantially parallel to the keel for at least an aft one half of its area, said parallel sidewalls extending from the exterior surface of the hull and being distal from the waterline;
    at least one air inlet connected to the recess;
    at least one air supply duct in fluid communication with the recess through an air inlet;
    pressure control means providing hull trim adjustment in fluid communication with the recess;
    sealing means in an aft portion of the recess;
    at least one powered air blower having its discharge in fluid communication with the recess through at least one air supply duct, whereby the recess may be pressurized to substantially purge it of water creating therein a captured air chamber beneath the waterline thereby significantly reducing hull displacement, and induced, as well as friction, drag at all speeds.

2. The hull of claim 1, which further comprises:
    propulsive means to drive the hull at a speed sufficient to cause it to approach planing speed, whereby the waterline approaches the air chamber and the exterior surface therebetween is minimized.

3. The hull of claim 1 wherein the recess has a contoured floor.

4. The hull of claim 1 wherein the sealing means comprises a labyrinth seal.

5. The hull of claim 1 wherein the sealing means comprises a step seal.

6. The hull of claim 1 wherein the blower is powered from the primary propulsive means for the hull but has therebetween a variable speed means thereby rendering blower speed substantially independent of primary propulsive means speed.

7. The hull of claim 1 wherein speed is increased by the air chamber.

8. An improved hull comprising:
    a substantially horizontal keel at one end curving upward in a single plane;
    a pair of downwardly sloping sidewalls intersecting the keel and forming therebetween in any vertical cross-section a symmetrical V about the plane of the keel;
    a bow having an acute included angle at an intersection of the sidewalls with the upward curving portion of the keel;
    a stern formed from a transom connected to the side walls;
    a waterline about an exterior surface of all of the foregoing;
    at least one recess in the hull substantially aft, said recess intersecting the exterior surface of the hull, at substantially right angles thereto entirely below the water line, having sidewalls substantially parallel to the keel for at least an aft one half of its area, said parallel sidewalls extending from the exterior surface of the hull and being distal from the waterline;
    at least one air inlet connected to the recess;
    at least one air supply duct in fluid communication with the recess through an air inlet;
    pressure control means providing hull trim adjustment in fluid communication with the recess;
    sealing means in an aft portion of the recess;
    at least one powered air blower having its discharge in fluid communication with the recess through at least one air supply duct, whereby the recess may be pressurized to substantially purge it of water creating therein a captured air chamber beneath the waterline thereby significantly reducing hull displacement, and induced, as well as friction, drag at all speeds.

9. The hull of claim 8, which further comprises:
    propulsive means to drive the hull at a speed sufficient to cause it to approach planing speed, whereby the waterline approaches the air chamber and the exterior surface therebetween is minimized.

10. The hull of claim 8 wherein the recess has a contoured floor.

11. The hull of claim 8 wherein the sealing means comprises a labyrinth seal.

12. The hull of claim 8 wherein the sealing means comprises a step seal.

13. The hull of claim 8 wherein the blower is powered from the primary propulsive means for the hull but has therebetween a variable speed means thereby rendering blower speed substantially independent of primary propulsive means speed.

14. The hull of claim 8 wherein speed is increased by the air chamber.

15. In an improved V hull of the cathedral type having at least one bow, keel, stern exterior surface, and waterline, wherein the improvement comprises:
at least one recess in the hull substantially aft, said recess intersecting the exterior surface of the hull at substantially right angles thereto entirely below the waterline, having sidewalls substantially parallel to the keel for at least an aft one half of its area, said parallel sidewalls extending from the exterior surface of the hull and being distal from the water line;
at least one air inlet connected to the recess;
at least one air supply duct in fluid communication with the recess through an air inlet;
pressure control means providing hull trim adjustment in fluid communication with the recess;
sealing means in an aft portion of the recess;
at least one powered air blower having its discharge in fluid communication with the recess through at least one air supply duct, whereby the recess may be pressurized to substantially purge it of water creating therein a captured air chamber beneath the waterline thereby significantly reducing hull displacement, and an induced as well as friction, drag at all speeds.

16. The hull of claim 15, which further comprises:
propulsive means to drive the hull at a speed sufficient to cause it to approach planing speed, whereby the waterline approaches the air chamber and the exterior surface therebetween is minimized.

17. The hull of claim 15 wherein the recess has a contoured floor.

18. The hull of claim 15 wherein the sealing means comprises a labyrinth seal.

19. The hull of claim 15 wherein the sealing means comprises a step seal.

20. The hull of claim 15 wherein the blower is powered from the primary propulsive means for the hull but has therebetween a variable speed means thereby rendering blower speed substantially independent of primary propulsive means speed.

21. The hull of claim 15 wherein speed is increased by the air chamber.

* * * * *